(12) United States Patent
Yung et al.

(10) Patent No.: US 7,154,205 B2
(45) Date of Patent: Dec. 26, 2006

(54) RE-TIGHTENABLE STATOR BODY WEDGE SYSTEM

(75) Inventors: Mabel Shang Yung, Clifton Park, NY (US); Thomas Richard Blakelock, Clifton Park, NY (US); Alan Michael Iversen, Clifton Park, NY (US); Sameh Salem, Rexford, NY (US); Thomas Rufus Butman, Jr., Delmar, NY (US); Adrian Breitenstein, Delanson, NY (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 11/080,439

(22) Filed: Mar. 16, 2005

(65) Prior Publication Data

US 2006/0208598 A1    Sep. 21, 2006

(51) Int. Cl.
*H02K 3/48* (2006.01)
(52) U.S. Cl. ...................... 310/214; 310/254
(58) Field of Classification Search .............. 310/214, 310/215, 254
See application file for complete search history.

(56) References Cited

U.S. PATENT DOCUMENTS

| | | | | |
|---|---|---|---|---|
| 2,723,358 A | * | 11/1955 | Holmgren | 310/214 |
| 4,149,101 A | | 4/1979 | Lesokhin et al. | 310/214 |
| 4,184,091 A | * | 1/1980 | Khutoretsky et al. | 310/214 |
| 5,598,049 A | | 1/1997 | Meier | 310/214 |
| 6,124,659 A | * | 9/2000 | Rowe et al. | 310/214 |
| 6,331,745 B1 | | 12/2001 | Blakelock et al. | 310/214 |
| 2001/0004175 A1 | | 6/2001 | Kelleher | |

FOREIGN PATENT DOCUMENTS

| | | |
|---|---|---|
| GB | 771654 | 4/1957 |
| GB | 1574746 | 9/1980 |
| GB | 2683337 | 1/1992 |

OTHER PUBLICATIONS

U.K. Search Report, Application No. GB0605111.4 by Examiner J. Cockitt on Jun, 19, 2006.

* cited by examiner

*Primary Examiner*—Dang Le
(74) *Attorney, Agent, or Firm*—Nixon & Vanderhye P.C.

(57) ABSTRACT

A generator stator core has a plurality of axially extending radial slots arranged about the periphery thereof with windings in each of the radial slots. At least one adjustable wedge and slide assembly is located in each of the slots, arranged to restrain the windings, the assembly including a wedge component and a slide component which interface along respective sloped surfaces formed on respective sides of each of the wedge component and the slide component. The slide component is formed with a zone of laterally extending, discrete fingers on each side thereof that are angled relative to a longitudinal axis of the slide. The wedge component is slidably received in a pair of dovetail grooves in the radial slot with the slide component located between the wedge component and the windings such that the discrete fingers engage side walls of the radial slot.

20 Claims, 3 Drawing Sheets

RE-TIGHTENABLE STATOR BODY WEDGE SYSTEM

BACKGROUND OF THE INVENTION

This invention relates to dynamoelectric machines generally, and, more specifically, to a new tapered slide component in a stator slot wedging system used to secure an armature winding in medium and large generators.

Stator winding wedge systems are designed to maintain radial pressure on the armature bars and slot components of a generator to thereby prevent the damaging effects of electromagnetic vibration forces. As the generator operates, load induced compressive creep and slot component material shrinkage cause a reduction in the radial force, which eventually results in a detectable loose wedge condition. Currently, when the wedging system of a generator becomes loose after operation for some time, the generator must be re-wedged. The present re-wedging process involves rotor removal and also removal of all of the old wedging material and subsequent replacement with new components.

This problem has been addressed previously in prior U.S. patent documents. For example, commonly owned U.S. Pat. No. 6,331,745 describes an adjustable slide that provides for an interlocking surface between the wedge and slide. The mating surfaces of the wedge and slide have a saw tooth pattern to allow for interlocking of the pieces to prevent reverse axial movement of the slide. The material and machining of the saw tooth pattern is very expensive and it is prohibitive to use this design throughout the entire length of the stator and, in fact, it is only adaptable to wedges located at the ends of the stator slot.

U.S. Pat. No. 4,149,101 describes another arrangement for locking the slot wedges, but it is also applied only to the end portion of the slot only.

U.S. Pat. No. 5,598,049 describes a slot sealing arrangement in which the elasticity of the wedge and slide are utilized to obtain optimum radial force along the entire central length of the wedge. No capability for preventing reverse axial movement of the slide is disclosed.

BRIEF DESCRIPTION OF THE INVENTION

The present invention provides a means by which the radial force on the armature bars of a generator may be restored by adjusting the position of the slide under the wedge, without removing the rotor. This permits reusing and extending the life of the original wedging system components, simplifying inspection processes and shortening outage cycles.

More specifically, the present invention relates to a redesign of the slide component to incorporate lateral locking features, as well as a redesign of the wedge component to accommodate a tool for retightening the slide component. In the exemplary embodiment, each lateral side of the slide component is formed with a defined number of discrete fingers or "herringbones" cut at a prescribed angle, with the herringbones slanted inwardly from their outer edges toward the longitudinal center axis of the slide in the direction in which the slide is to be driven. The angle of the herringbones and the cut width or slots between the herringbones may vary for specific applications. In addition, the cross-sectional width of the slide area containing the herringbones is wider than the remainder of the slide, allowing for this section of the slide to flex and engage the side walls of the stator slot. This contact provides an additional frictional force over and above the frictional force between the slide and wedge mating surfaces. More specifically, given the angled orientation of the herringbones, and their inherent flexibility, lateral forces are developed against the side walls of the stator slots, and it is this frictional force of the herringbones against the stator slot walls that prevents reverse displacement of the slide that would otherwise result in a loss of radial force on the armature bars.

The redesigned slides are also shorter in length than the associated wedges in order to permit axial adjustment during retightening that restores the radial force, thus compensating for the effects of load relaxing that occur over time.

Retightening can be done with the rotor in situ by using a specially designed tool for driving the slides under the associated wedges. This tool may be anchored through a hole in the top of the wedge component, and a push-arm located in a cut-out at the end of the wedge component, enabling engagement with the end of the next adjacent slide. The push-arm is able to drive the slide axially forward to increase the radial force on the wedge and slot components. By being able to reach the slide with this tool, one can just retighten the wedge or wedges that need to be retightened, whether the wedge is an end wedge or a wedge spaced axially inwardly of the end wedge.

Accordingly, in one aspect, the present invention relates to generator stator core having a plurality of axially extending radial slots arranged about the periphery thereof with windings in each of the radial slots; at least one adjustable wedge and slide assembly in each of the slots, arranged to restrain the windings, the assembly including a wedge component and a slide component which interface along respective sloped surfaces formed on respective sides of each of the wedge component and the slide component, the slide component formed with a zone of laterally extending, discrete fingers on each side thereof that are angled relative to a longitudinal axis of the slide, the wedge component slidably received in a pair of dovetail grooves in the radial slot with the slide component located between the wedge component and the windings such that the discrete fingers engage side walls of the radial slot.

In another aspect, the invention relates to an adjustable wedge and slide assembly for a generator stator core having a plurality of axially extending radial slots arranged about the periphery thereof with stator windings in each of the radial slots; the wedge and slide assembly adapted for insertion in each radial slot so as to restrain the windings in a respective one of the radial slots, the wedge and slide assembly including a wedge component and a slide component adapted to interface along matching, sloped bottom and top surfaces, wherein the slide component is formed with a plurality of laterally extending fingers at a location axially between opposite ends of the slide, the fingers adapted to flexibly engage opposed side walls in the radial slot.

In still another aspect, the invention relates to a slide component for an adjustable wedge and slide assembly adapted to apply radial forces to windings in a radial slot of a stator core, the slide component formed with a plurality of laterally extending, discrete fingers on opposite sides of the slide component, the fingers extending at an acute angle relative to a longitudinal axis of the slide component.

The invention will now be described in detail in connection with the drawings identified below.

DETAILED DESCRIPTION OF THE INVENTION

Figure 1:
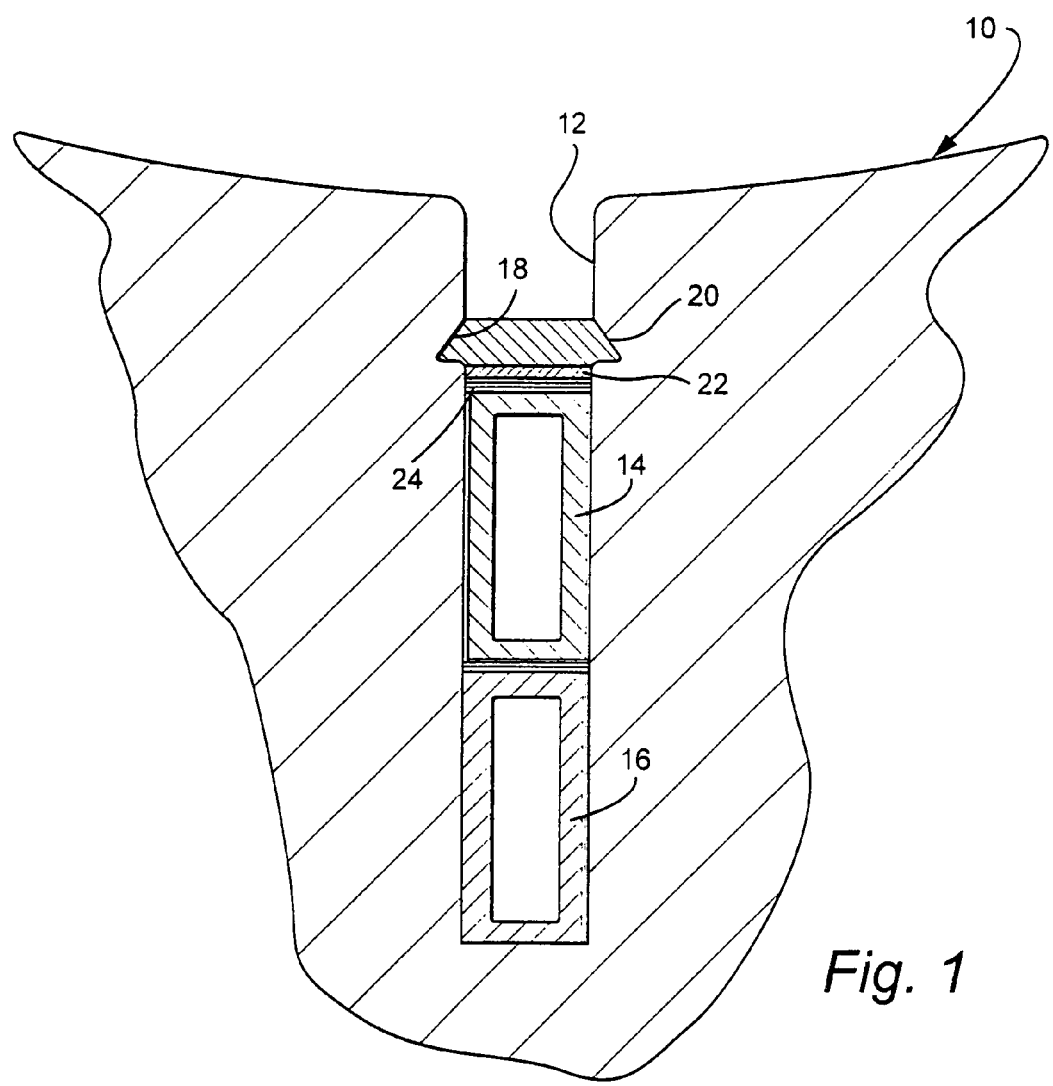
FIG. 1 is a cross section of a typical generator slot showing a wedge in the dovetail, with a slide and underlying spacer components.

Referring initially to FIG. 1, the generator stator core is partially shown at 10, it being understood that the core includes a plurality of radial slots 12 which extend axially along the core and which receive stator windings 14, 16. Each slot 12 is formed adjacent its mouth with dovetail grooves or undercuts 18 permitting wedge and slide components 20, 22 to be inserted in an axial direction within a slot. If needed, one or more filler strips 24 may be inserted in conventional fashion between the winding 14 and slide 22. Note that, relative to the slot 12, the slide 30 is radially inward of the wedge 48.

Figure 2:
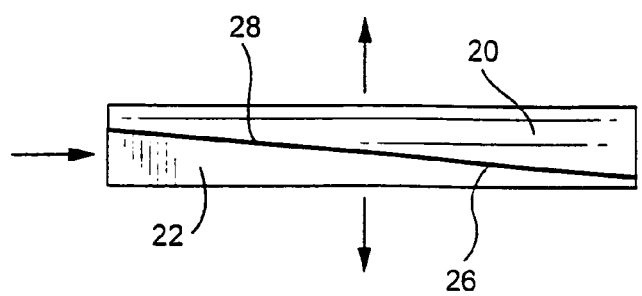
FIG. 2 is a schematic side elevation of conventional slide and wedge components.

FIG. 2 illustrates the manner in which flat sloped surface 26, 28 on conventional wedge and slide components 20, 22 cooperate to apply radial force on the stator bars as the slide component is driven under the wedge in a conventional stator winding wedge system.

Figure 3:
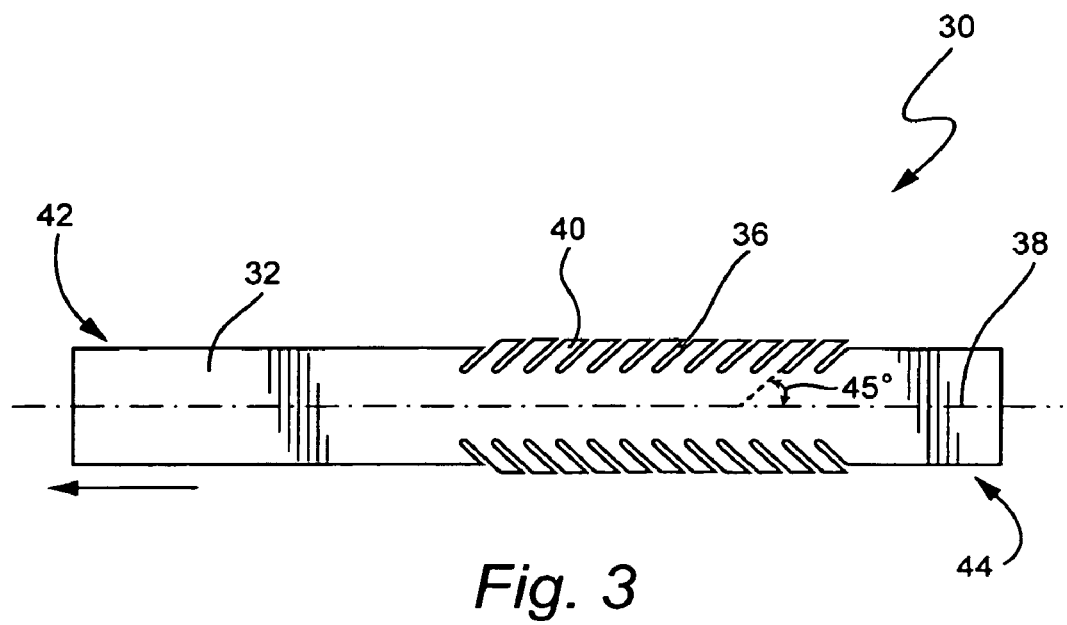
FIG. 3 is a top plan view of a slide component in accordance with an exemplary embodiment of the invention.

Turning to FIG. 3, the new slide component 30 in accordance with an exemplary embodiment of this invention is formed with a sloped top surface 32 and a flat bottom surface 34 (see FIG. 6) much like the conventional slide component 22 in FIGS. 1 and 2. In this case, however, a plurality of slots 36 are cut into the slide component at an acute angle relative to the longitudinal axis 38 of the slide component. These slots terminate short of the longitudinal axis 38 and create a pattern of laterally extending fingers or "herringbones" 40 that are slanted rearwardly about 45° (relative to a forward insertion direction) to thereby facilitate entry into the stator core slot 12 between the wedge 20 and armature bars 14, 16 in the forward insertion direction indicated by the directional arrow in FIG. 3. It will be appreciated that the angle of the herringbones 40 (relative to axis 38) and the width of the slots 36 between the herringbones may vary. It is significant to note that the cross-sectional width of the slide 30 in the area of the herringbones 40 is slightly wider than the remaining forward and rearward sections 42, 44, respectively, of the slide. The wider section of the slide in the patterned area of herringbones 40 insures that the latter will engage the side walls of the stator slot 12, thus providing additional lateral frictional forces over and above the radial frictional forces generated by the engagement of the sloped mating surfaces 32, 46 of the slide and wedge components 30, 48, respectively. The herringbones 40 are angled to the extent that on driving the slide, the inherently relatively flexible herringbones will flex and not break off or result in such a high driving force that the slide component 30 cannot be driven into place. It is this lateral frictional force of the herringbones against the side walls of the stator core slot 12 that prevent rearward displacement of the slide 30 that would otherwise result in a loss of radial force on the armature bars.

Figure 6:
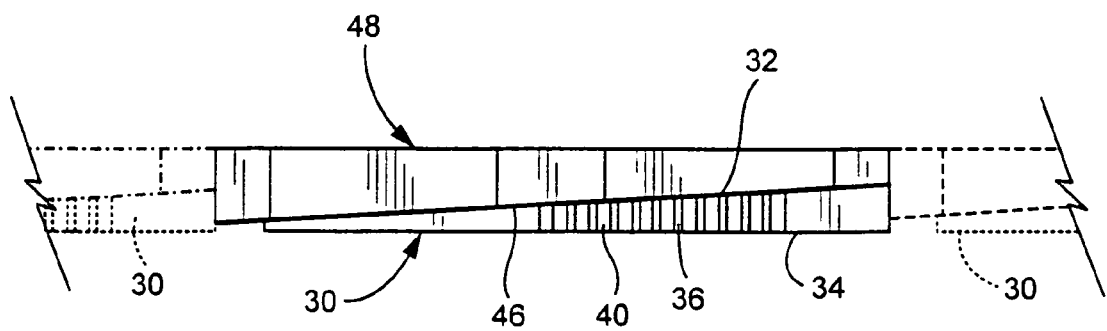
FIG. 6 is a side elevation of the wedge and slide components shown in FIG. 5.

As can be best seen in FIG. 6, each slide 30 is shorter in length than the associated wedge component 48. This provides sufficient space to permit axial adjustment of the slide 30 component during retightening.

The wedge 20 and slide 30 may be made of a known cotton phenolic composite laminate, or other suitable material.

Figure 4:
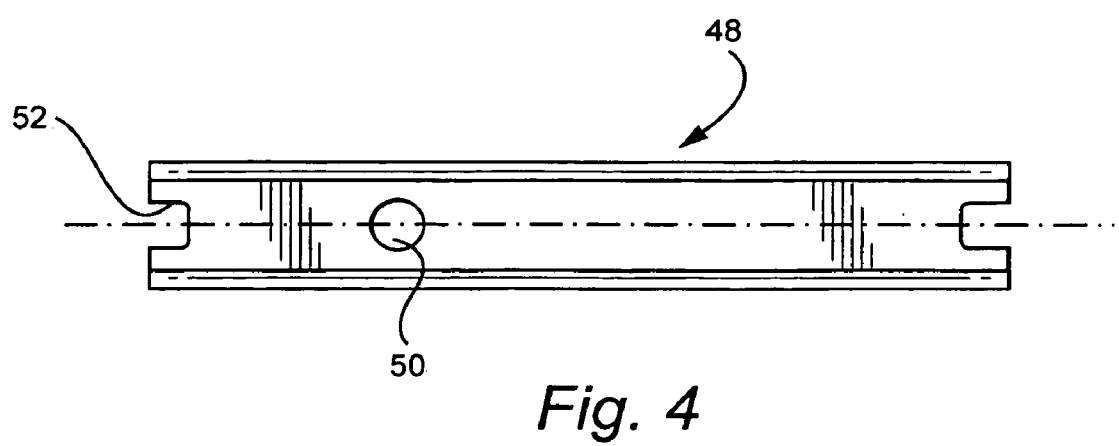
FIG. 4 is a top plan view of a wedge component in accordance with the exemplary embodiment of the invention.
Figure 5:
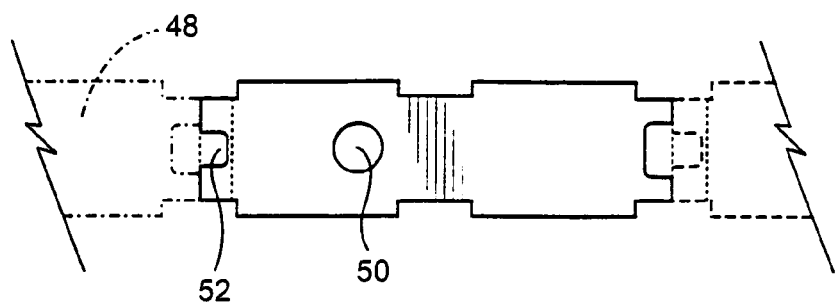
FIG. 5 is a top plan view of a wedge and slide assembly in accordance with the exemplary embodiment of the invention.

The retightening process itself can be done with the rotor in situ by using a specially designed tool for driving slides under wedges. The tool may be of the type disclosed in commonly owned U.S. Pat. No. 6,421,914 or U.S. Pat. No. 6,584,680, but other suitable tools may be utilized. In this regard, a hole or tool aperture 50 in the wedge component 48 (see FIG. 4) provides an anchor point for the tool, and a tool slot 52 at the forward end of the wedge 48 permits access by a push arm of the tool to the end of the next adjacent (and axially inboard) slide (see FIG. 5). By being able to access the slide with such a tool, one can simply drive the slide inwardly from its first or original position to a second new position to thereby retighten the wedge or wedges that need to be retightened, regardless of the location of the wedge and slide assembly along the length of the core.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator stator core having a plurality of axially extending radial slots arranged about the periphery thereof with windings in each of said radial slots; at least one adjustable wedge and slide assembly in each of said slots, arranged to restrain said windings, said assembly including a wedge component and a slide component which interface along respective sloped surfaces formed on respective sides of each of said wedge component and said slide component, said slide component formed with a zone of laterally extending, discrete fingers on each side thereof that are angled relative to a longitudinal axis of said slide, said wedge component slidably received in a pair of dovetail grooves in said radial slot with said slide component located between said wedge component and said windings such that said discrete fingers engage side walls of the radial slot.

2. The generator stator core of claim 1 wherein a width dimension of said slide in said zone is greater than width dimensions of remaining portions of said slide.

3. The generator stator core of claim 1 wherein said discrete fingers are oriented at about a 45° angle to said longitudinal axis.

4. The generator stator core of claim 3 wherein said discrete fingers are separated by similarly angled slots that terminate short of said longitudinal axis.

5. The generator stator core of claim 1 wherein said wedge component is formed with a slot at each end thereof.

6. The generator stator core of claim 5 wherein said wedge has a flat top surface and said slide has a flat bottom surface, said wedge formed with a tool aperture in said top surface.

7. The generator stator core of claim 1 wherein said slide is composed of a cotton-phenolic composite laminate.

8. The generator stator core of claim 1 wherein said discrete fingers are separated by similarly angled slots that terminate short of said longitudinal axis.

9. An adjustable wedge and slide assembly for a generator stator core having a plurality of axially extending radial slots arranged about the periphery thereof with stator windings in each of said radial slots; said wedge and slide assembly adapted for insertion in each radial slot so as to restrain said windings in a respective one of said radial slots, said wedge and slide assembly including a wedge component and a slide component adapted to interface along matching, sloped bottom and top surfaces, wherein said wedge component is received in dovetail slots on opposite sides of said radial slot and said slide component is located between said wedge component and said windings, and further wherein said slide component is formed with a plurality of laterally extending fingers at a location axially between opposite ends of the slide, said fingers adapted to flexibly engage opposed side walls in the radial slot.

10. The adjustable wedge and slide assembly of claim 9 wherein a width dimension of said slide in said zone is greater than width dimensions of remaining portions of said slide.

11. The adjustable wedge and slide assembly of claim 9 wherein said discrete fingers are oriented at about a 45° angle to said longitudinal axis, in a rearward direction relative to an insertion direction.

12. The adjustable wedge and slide assembly of claim 11 wherein said discrete fingers are separated by similarly angled slots that terminate short of said longitudinal axis.

13. The adjustable wedge and slide assembly of claim 9 wherein said wedge component is formed with a slot at each end thereof.

14. The adjustable wedge and slide assembly of claim 13 wherein said wedge component has a flat top surface and said slide component has a flat bottom surface, said wedge component formed with a tool aperture therein.

15. The adjustable wedge and slide assembly of claim 9 wherein said slide component is composed of a cotton phenolic composite laminate.

16. The adjustable wedge and slide assembly of claim 9 wherein said discrete fingers are separated by similarly angled slots that terminate short of said longitudinal axis.

17. A slide component for an adjustable wedge and slide assembly adapted to apply, an initial radial forces to windings in a radial slot of a stator core and subsequently to adjust the force back to the initial force, wherein a wedge component of the assembly is received in a pair of grooves on opposite sides of the radial slot and the slide component of the assembly is adapted to be located between the wedge component and the windings, said slide component formed with a plurality of laterally extending, discrete fingers on opposite sides of said slide component, said fingers extending at an acute angle relative to a longitudinal axis of said slide component, and adapted to engage opposed side walls of the radial slot, radially inward of the pair of grooves.

18. The slide component of claim 17 wherein said acute angle is about 45°.

19. The slide component of claim 17 wherein said slide component is composed of a cotton-phenolic composite laminate.

20. The generator stator of claim 17 wherein said discrete fingers are separated by similarly angled slots that terminate short of said longitudinal axis.

* * * * *